United States Patent [19]
Lans

[11] Patent Number: 5,506,587
[45] Date of Patent: Apr. 9, 1996

[54] POSITION INDICATING SYSTEM

[75] Inventor: Håkan Lans, Saltsjöbaden, Sweden

[73] Assignee: GP & C Systems International AB, Saltsjobaden, Sweden

[21] Appl. No.: 170,167

[22] PCT Filed: Jun. 29, 1992

[86] PCT No.: PCT/SE92/00485

§ 371 Date: Dec. 23, 1993

§ 102(e) Date: Dec. 23, 1993

[87] PCT Pub. No.: WO93/01576

PCT Pub. Date: Jan. 21, 1993

[30] Foreign Application Priority Data

Jul. 1, 1991 [SE] Sweden ................................. 9102034
Aug. 15, 1991 [SE] Sweden ................................. 9102362
Nov. 28, 1991 [SE] Sweden ................................. 9103542

[51] Int. Cl.$^6$ .............................. G01S 5/02; G01S 1/08; H04J 3/12; H04J 3/24
[52] U.S. Cl. .......................... 342/357; 342/454; 342/386; 370/104.1; 370/93
[58] Field of Search ....................... 342/454, 455, 342/456, 457, 357, 386; 370/95.3, 104.1, 105, 100.1, 94.2, 93

[56] References Cited

U.S. PATENT DOCUMENTS

| | | | |
|---|---|---|---|
| 3,566,404 | 2/1971 | Sorkin | 342/31 |
| 5,153,836 | 10/1992 | Fraughton et al. | 364/461 |
| 5,325,302 | 6/1994 | Tzidon et al. | 364/461 |
| 5,367,524 | 11/1994 | Rideout, Jr. et al. | 370/104.1 |

Primary Examiner—Gregory C. Issing
Attorney, Agent, or Firm—Young & Thompson

[57] ABSTRACT

A plurality of movable objects, such as aircraft, are provided with GPS receivers, enabling the individual determination of longitude and latitude. Further, the receiver also receives a very precise time base from the GPS satellites. This very precise time base is used to enable all of the plurality of movable objects to transmit in a predetermined radio frequency their identities and positions in precisely determined time blocks. By limiting the range of the frequencies used by the movable objects to transmit, the range of receivability is limited, such that the system may be implemented as a worldwide overlapping mosaic. The transmissions of each movable object may be received by all of the plurality of movable objects, as well as by air traffic monitoring centers on the ground.

13 Claims, 4 Drawing Sheets

POSITION INDICATING SYSTEM

BACKGROUND OF THE INVENTION

1. Field of the Invention

The invention regards a system for indicating the positions of movable objects, which enables for a population of movable objects or stations to keep trace of one another and for a central station or a number of central stations, in some cases, to keep trace of the positions of individual and/or all the members of that population.

2. Description of the Related Art

Systems for the determination of position are well-known since a very long time, e.g. the DECCA system, the LORAN system, the VLF OMEGA system, NDB, VOR and DME. For the use of central stations, there are known different types of radar systems, such as primary radar (PSR) and secondary surveillance radar (SSR). The SSR radar system includes a ground based interrogator and SSR Transponders in the movable objects.

In recent times has been created the American GPS (Global Positioning SYSTEM) and a Russian corresponding system called GLONASS, which both build on time signals sent from satellites having known orbit elements. When at least four such satellites are above the horizon, it is possible to obtain locally an unequivocal position with a very high accuracy. Devices for obtaining such position information are well-known and commercially available, making it superfluous here to describe them in more detail than is necessary for the description of the present invention.

The fact that a precise position can be obtained with equipment having a reasonable price has led to its proposed use for navigating and surveillance for e.g. aviation, the congestion of which has become notorious in recent years. According to GB-A-2 155 720, it has been proposed to include in an aircraft Transponder response to an interrogation from a control station, not only its usual identification response, but also the position determined by GPS of the movable object carrying the transponder.

In U.S. Pat. No. 4,835,537, hereby included by reference, it is proposed to obtain an anti-collision system where aircraft, runways, fixed obstacles and land vehicles on airports signal their positions to all participants. Thereby, the signaling is made in a single radio channel for all participants, each participant seeking a moment when the channel is unoccupied and starting signalling its message after the lapse of a random wait time. The transmitting power is held at a low level in order not to exceed an air volume radius of a monitored airspace.

At present, the responsibility to monitor and control the air traffic around the earth is divided into a number of Area Control Centers (ACC) or Flight Information Centers (FIC), each of them having responsibility over dedicated regions (Flight Information Regions—FIRs) within which ground monitoring and control of air traffic operating in certain or all parts of the airspace and/or to provide certain services to aircraft which have filed a flight plan. Each time an aircraft leaves one of those FIRs, the control center of the next FIR is notified about the trajectory taken, so that the aircraft can be detected or identified. Before entering into the next FIR the crew of the aircraft is ordered to establish radio contact with the control center which FIR the aircraft is about to enter.

The air traffic must follow a limited number of air corridors, often called "airways", or predetermined routes. The airways are established along ground based radio navigation beacons or by a combination of the locations of such radio navigation beacons and "fixed points" determined by the distance and bearing to/from such ground based beacons. The aircraft are navigating by means of receivers on board which can detect the signals from the ground based radio navigation beacons and has a display unit which shows the location of the aircraft in relation to the ground based beacon. Over and in the vicinity of land also the control centers are monitoring and controlling the movements of aircraft by radar. The minimum lateral separation between aircraft flying at the same altitude in these radar controlled areas can vary between normally 5–10 nautical miles. On final approach to an airport, the minimum radar separation between aircraft is typically 3 nautical miles. In areas without radar coverage, the minimum separation for air traffic at the same altitude and track is normally 10 minutes, which, depending on the speed of the aircraft, corresponds to a distance of up to 80–90 nautical miles.

Air traffic over the oceans follows predetermined routes. Due to the fact that it is not possible to determine an aircraft position by means of ground based radio beacons or by radar when operating over the oceans, the separation between aircraft must be significantly increased. Normally, the minimum lateral separation between aircraft flying on the same track and at the same altitude is, as in the case over the North Atlantic, 60 nautical miles. At present, the number of airways and routes is limited, and aircraft have to be confined to so-called "slots", which are apportioned to the air companies or to the individual aircraft, often very long in advance. Should an aircraft by any reason be delayed for a few minutes on the ground, and miss its slot, this may cause additional delays of up to several hours before the aircraft can obtain a new free slot.

Special flow management or flow control units are established in many areas of the world. The need for these flow management units and the slot allocation procedures is caused by the lack of capacity in the airways system, along the flight routes and at the busy airports.

At airports, the capacity is limited by a number of different factors. Basically, the number of runways, taxiways and aircraft gates, meteorological conditions, navigation and landing equipment, air traffic control procedures, etc., are important elements which separately or collectively affect the capacity. In situations with poor visibility, the capacity problems are increasing, mainly due to the inability of present technology to provide air traffic control with the capability to monitor and control aircraft and ground vehicle movements. The runway occupancy times are also increasing as aircraft have to taxi at lower speeds due to difficulties to navigate on the ground in poor visibility. This also reduces the airport capacity.

The number of incidents and fatal accidents caused by potential or actual collisions between aircraft on the ground and aircraft and ground vehicles has increased over the last decades. The number of such serious incidents reported in the USA is in the order of 5–7 per 100,000 take-off and landings. A number of fatal accidents have occured over the years.

A system which can offer the possibilities for air traffic control to monitor and control aircraft ground operations as well as ground vehicle movements, having each member in the system transmitting its position and identification, presenting that information presented to air traffic control, e.g. on a display, as well as providing the same information to the pilots, and which information could also be used to guide the aircraft movements would be of significant importance to the improvement of airport capacity and safety.

The capacity and safety problems are expected to become worse as air traffic is forecasted to continue to grow at a relatively high rate. A doubling of the present number of air passengers (approx. 1.2 billion) and an almost proportional increase thereto of the number of aircraft operations is expected over the next 10–12 years.

According to a spokesman for the German Aerospace Research Establishment, "If we could get one additional landing per hour at Frankfurt, over a year it would mean 10 million deutschmarks savings in delays." (New scientist 16 November 1991 p. 23).

Several international working groups have been established to review the present situation and to recommend actions to be taken to improve the capacity of the present air navigation an air traffic control system, as well as for the improvement of the safety on the ground. Several of these working groups are conducting their work under the auspices of the International Civil Aviation Orgainzation—ICAO. In several countries, especially in the USA, significant efforts are being made to solve the safety problems related to ground operations at airports.

Thus, it is globally recognized that there is a shortage of capacity and that significant economic savings are possible if systems which can provide an improved capability to control and monitor the air traffic can improve both safety and capacity.

OBJECTS AND SUMMARY OF THE INVENTION

It is a general object of the invention to obtain a system for the control of a population of movable entities as to their locations, by each member sending out own positions in a common radio channel, and which admits even very large populations, for avoiding collisions and admitting of central control. Populations envisaged can be aircraft, ground vehicles or ships. In order for such a system to work optimally, it is necessary to avoid not only collisions of a purely physical nature, but also collisions of a communications nature, both as concerns actual collisions meaning that more than one participant transmits simultaneously so that they disturb each other, and inability to transmit due to congestion of the common communication channel.

Specifically for aviation purposes, it is an object to obtain a system which can be used by an aircraft everywhere without exception. Collision risks are naturally highest where traffic is dense, but random accumulations of aircraft could pop up practically anywhere around the earth.

A further object for aviation purposes is to create a better possibility of distributing aircraft, in order to increase the airspace capacity, by avoiding the necessity of the beacon infrastructure through a distributed localization, each aircraft having its own means enabling it to follow any predetermined corridor or route, which does not have to be materialized by common landbased hardware. Particularly where beacon systems have not yet been installed, great savings are possible in this respect. Further, when routes may be defined which do not depend on a beacon system, the number of routes may be increased practically at will, and it is possible to avoid present congestion at least outside the neighbourhood of airports. Bottlenecks in takeoff and landing can also be avoided to a great extent if systems for air traffic control are improved, so that lateral and/or vertical separation between aircraft can be reduced and the airspace capacity can be improved without increased collision risk.

On long-haul flights over sea or uninhabited areas, there is presently no systems available for accurate surface control of aviation, since the aircraft cannot be detected by e.g. radar. It is a further object of the invention to enable aircraft in such positions to be able to report their positions to central control, preferentially by satellite communication, and the frequency of the reporting may then be decided in the aircraft in dependence of local traffic intensity, to be determined by the system.

Said objects and other objects and advantages are obtained, according to the invention, by means of a position indicating system comprising a population of simultaneously active movable stations, which each sense their geographical positions through the reception of signals from geometrically distributed transmitters having known positions, and wherein each participating station has a transmitter for sending out in a radio channel common to the system of signals indicating own identities and geographical positions, and memory means for storing of signals from other participating movable stations, and whereby according to the invention each station has handling means, as a computer, comprising a time base which is precision controlled by time signals received from said geometrically distributed transmitters, said time base defining time blocks standardized thereto and enumerable in a predetermined, repetitive maximum frame, said memory means registering free time blocks where no transmission is perceived, means for selecting one of said free time blocks for own repetitive transmission of identity and position therein, said transmitter working in a frequency having a range substantially confined to the line of sight, and preferably means for randomly switching of a used one of said time blocks for another block registered as free. According to a preferred embodiment, each station also determines traffic density in its environment and decides in function thereof how many time blocks are to be used in successive frames.

It is preferred to have in each station a monitor or the like, to show the locations of other stations superimposed on e.g. a map. Another advantageous feature is the determination of actual risk of collision due to geographical neighbourhood, for warning the crew with a danger signal. As there is an established network of ground control centers (Area Control Centers—ACC or Flight Information Centers—FIC) for the control or monitoring of all air traffic movements, all aircraft movements should be reported to ground, so that in principle only air traffic control can allocate a change of routing including altitude. In uninhabited regions, the signalling of dangerous congestion to the ground control centers should be made by satellite communication.

A particular safety and redundancy feature is the possibility to use the transmission from other movable objects and/or ground stations for secondary localization purposes. If an aircraft loses the facility of satellite localization, it is possible for that aircraft to keep its timebase working by synchronizing to the other movable objects' and/or ground stations' transmissions, and since those aircraft are emitting position signals, in precise timing according to good timing in UTC time, they may serve as a secondary system of geometrically distributed transmitters, replacing the satellites.

According to a preferred embodiment of the inventive system, it is intended that a ground station, e.g. at an airport, shall be able to order nearby aircraft to stop transmitting spontaneously and switch over to transmitting in ordered mode in time blocks in the maximum frame, which are designated by the station. The ground station would need to give this order only once, which means a great saving in channel occupation compared to conventional polling. In comparison to presently used radar surveillance, there is the certain advantage that aircraft coming in towards an airpart will not be shading each other even if they come in at a common direction. The order from the ground station may be modified for more frequent transmission when the aircraft come closer i.e. for sending several times in each maximal frame.

According to another preferred embodiment, the same system may be used for tracking ground traffic on e.g. an airport. Each vehicle allowed on the airfield would then carry a complete system, which signals to the ground control unit concerned and may also be received by the other vehicles or aircraft. At least the ground control station would then have a display with a map showing the movements of all the vehicles and aircraft, and also the vehicles may be similarly provided if desired. Aircraft similarly equipped will be shown as well. In view of the fact that large airports may have hundreds of vehicles and aircraft moving around, the system would greatly contribute to improving the safety.

The local time bases can be made extremely precise when working in the GPS system, since each of the satellites emits time signals in UTC time. In order to calculate the position, a minimum of four satellites must be received, there being unknown three space coordinates and time. Since the speed of light is known, the respective distances to the satellites and the true UTC time are determined from those time signals. (If the altitude is known, theoretically only three satellites are necessary). It can then be counted on to have an accuracy in UTC time available to about 100 ns. Evident military considerations have led to a time jitter of random character being added to the satellite time signals (called Selective Availability—S/A), making it necessary for very exact position determination to have access to a ground station (called Reference Station) within coverage for compensating this time jitter. However, the time accuracy is quite sufficient for the purposes of the invention, as each station has access to a timebase having this kind of accuracy.

Instead of using such a high-precision time normal, it is also possible to arrange for one of the movable stations to be designated as a time master by drawing lots. In view of the good standard time available from the GPS satellites, it is preferred to utilize this time. However, if the GPS satellite receiver of one station fails, the timers of the other movable stations may be used as a reserve facility. If the GPS satellites themselves fail, resort may be taken to the signals sent in the transmission channel by existing fixed stations in airports, and the movable stations would be able to transmit their positions as known, giving a positioning system which is inferior but still usable in the emergency. According to the invention, therefore, each movable station utilizes for transmission time blocks defined by a common timebase. Each station attempts to select time blocks which are not occupied by another station. Simultaneously, each station listens to the predetermined radio frequency and determines the relative positions of at least the nearest neighbors in relation to its own position. The own station determines going out therefrom how often it shall transmit. An aircraft over empty sea may perhaps send out its position once a minute, whereas another aircraft in very heavy traffic would have to send out its position in very short intervals.

In accordance with a preferred embodiment, the risk of colliding transmissions can be greatly diminished, in that an autonomously transmitting station may signal an indication in a regular transmission that it is going to switch time block and to which time block of those which are free the switching is to be made. This information is sent in the last message in the old block and possibly in one or more preceding sendings in this block. The other participants will then know this and will not collidingly appropriate this time block. A newcomer will listen to one or more maximal frames before transmitting and will therefore not try to transmit in a time block which is thus pre-appropriated. Thus, this type of collision could hardly occur except in the rare case when two newcomers are simultaneously entering and by chance both occupy a free time block. The probability of this is further diminished by the fact that entering the system is normally done when starting from an airport and will start transmitting ordered by the central control there.

The invention is not limited to use in air traffic or at sea, but can also be used on land,in order to keep trace of trains, trucks, taxis or even animals provided with the necessary equipment. In certain cases and according to a particular embodiment, the central may order a participant to send more than its own position. Each station has stocked in its memory the positions of other movable stations, the signals of which it has received. It is then possible for the central station to demand the transmission of this memory content, making it possible for stations to be located, the transmissions of which have perhaps not been received by the central station.

Going out from the fundamental idea that all the movable stations in the system have an accurate time base, the allocation of time blocks can be made in many ways, their length may be selected in many ways, as also the signaling speed and thereby the utilized bandwidth.

In a representative case, and depending on the circumstances, the exchanged information in each transmission may be 150–200 bits. With a transmission speed of 9600 baud, such a message takes a maximum of slightly over 20 ms. To switch from reception mode to transmission mode takes time, 1–3 ms, and since a station must listen to all time blocks where it is not transmitting itself, it is necessary to arrange such dead time first in each time block, compensating for speed of light and making it possible for a transmitting station to listen to an eventual message in the next following time block. A suitable length of the time block could then be 26.66 ms, so that each minute comprises 2250 time blocks. For practical reasons, it is suitable to let a certain period, e.g. one minute, be a kind of maximal frame.

Each station listens to the traffic in the allocated frequency and registers in its memory which time blocks are free, and also the position etc. for those stations, the signals of which are detected. This information is automatically treated in order to determine how near the neighbors are and how often the own transmission shall be made. Those who have no near neighbors do not need to transmit often, e.g. only twice or a few times per minute.

The information may also be treated for showing on a monitor, In a suitable scale, then, the surrounding stations may be shown, with a vector, the length of which shows speed, and with numbers showing altitude. In contradiction to ordinary radar, this image or map is referred to a fixed coordinate system (plotted). This simplifies greatly the ocular analysis of eventual risks of collision. In some cases, for instance when the object is to keep order on serving vehicules on an airport for avoiding collisions, it is possible to leave out the monitor in each vehicle, as it is then sufficient if the central control can survey the system on a monitor.

As mentioned, it is envisaged that a station may be active in an autonomous mode or in a ground station ordered mode. In autonomous transmission mode, the individual station selects a time block which is not found occupied in previous listening. In order to avoid that more than one station appropriates the same time block and blocks it, something none of them can perceive, being unable of simultaneous transmission and reception, they systematically change the selection of time block, at frequent intervals, using a random number generator (pseudo-random algorithm). For instance, the station may jump for a randomly determined number of occupied time blocks to a free time block. If, as previously explained, the jumping is previously announced and the new time block thus preempted, mutual interference can be practically excluded.

The ordered mode is normally set by an order from a fixed station, e.g. from the air control of an airfield (ground station ordered mode). The fixed station has the same time base and can call movable stations in a free time block, allocating individual time block series to them and making them stop autonomous transmitting, transmitting then only in said time block series. The air control station can then obtain positional information from the selected stations in arbitrary intervals. It is suitable to limit the available time blocks for the ordered mode to, say, 75% of the whole maximum frame, but even with this limitation, there are available in the above-indicated example some 1685 time blocks per minute. Even if as many as 50 aircraft are to be kept accurate track of, they can then transmit with intervals of about 2 seconds. This should be compared to standard rotating radar systems, the antennas of which rotate slower than some 6–8 seconds per revolution. This example is very schematic, as aircraft are normally transmitting with different rates, and the highest rate is necessary only for aircraft very near to an airport.

Also the air traffic control can monitor the traffic on a display in an appropriate scale, and keep a surveillance of a far more precise quality than what has been possible hitherto, particularly so in areas where radar systems cannot or have not been arranged. For countries which have not yet availed themselves of important ground based air traffic control infrastructure for aircraft control, the present invention could furnish a high-quality, cost effective alternative to an infrastructure investment which may presently be beyond their available means. Over regions presently outside of radar coverage, movable stations may report by satellite communication the identity, position, altitude etc. to inform responsible ground control centers of all positions, and a ground station may then order an aircraft to change its heading or altitude in order to avoid collisions. In order to arrive at a precise time, thus avoiding crowding and queuing or circling in holding patterns before landing at the airport, air traffic control may suggest that an aircraft should cruise at a certain speed.

The invention makes possible several advantages for the air traffic. A first advantage is that it is possible to dispense with aviation corridors —the airways, defined by radio beacons, which have previously led to congestion and sometimes made the flight length between airfields longer than necessary. A second advantage is the improved possibility to keep track aircraft and ground vehicle movements. In many cases, the capacity of a runway can be increased. At dead calm, the air perturbations created by aircraft over the runway may remain during some minutes, but normally, they are very quickly removed by the wind, so that even with weak side wind, the capacity may be increased, as the separation between successive landing or starting aircraft could be diminished without increasing the collision risk. In poor visibility, aircraft could taxi on the ground at higher speed, thus minimizing runway occupancy time and improving the capacity.

In Appendix X there is given an overview of some of the potential applications for civil aviation.

In maritime traffic, the great problem is that many seeways and harbors are severely congested, presenting dangers particularly in bad weather, and collisions may have serious consequences not only for the ships themselves. Also here, the invention may be very valuable. If both the maritime traffic and the air traffic are provided with devices according to the invention, each with its own allocated frequency, a supplementary advantage is possible. With distress at sea, a distressed ship may be permitted to break in at the air traffic frequency to send a MAYDAY message, likely to be caught by the station of an aircraft, in view of its high altitude. The airborne station could then break in at the maritime frequency and reach other ships, which cannot be reached by positional signals from the distressed ship.

DETAILED DESCRIPTION OF A PREFERRED EMBODIMENT OF THE INVENTION

EXAMPLE

Figure 1:
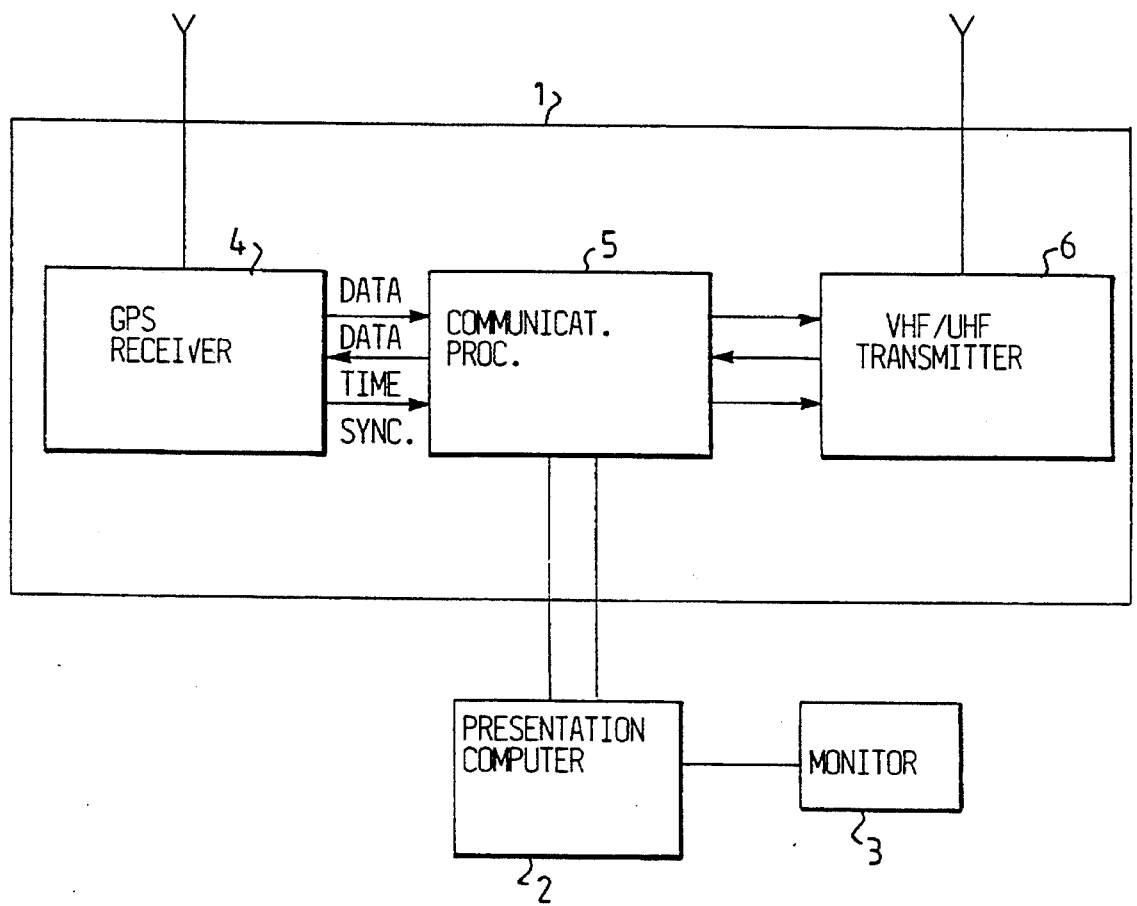
FIG. 1 shows a schematic block diagram of a station according to the invention.

A movable station shown in FIG. 1 comprises a unit 1 which keeps trace of traffic, a presentation computer 2 and a monitor 3 on which a pilot may survey traffic and observe it visually. Unit 1 comprises a satellite receiver 4 for the GPS system, which receives signals from a plurality of satelliters, which signals comprise time signals and orbital elements. In principle, the invention is not limited to the use of the GPS satellites, as the russian GLONASS system or a combination of GPS and GLONASS can be used to determine the position of a movable object. Such GPS units are commercially available, e.g. the Magnavox MX 4200 from Magnavox Corp., USA. Therefore, nothing more needs to be said than that such a unit may deliver the geographical position in longitude and latitude with high precision, altitude with somewhat less precision, and UTC time with very high precision. Further, information on speed and course is available. This information is available for the communication processor 5, which in its turn is connected to a transmitter-receiver 6. The satellite receiver 4 works at 1.4 GHz, whereas the transmitter-receiver works at 141 MHz.

Figure 2:
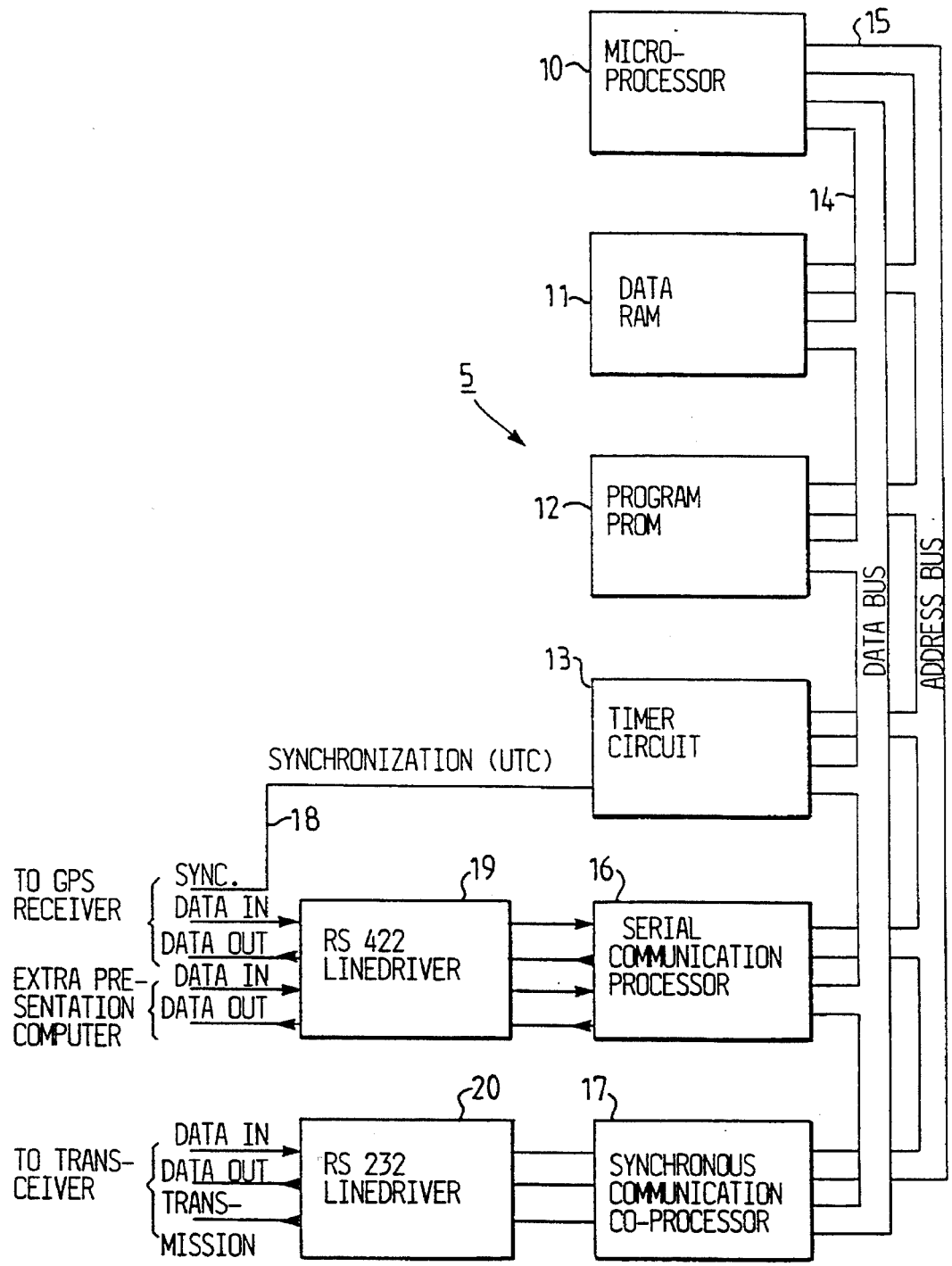
FIG. 2 shows a communication processor for a station.

The exemplified communication processor is shown more in detail in FIG. 2.

The following information is sent out at each transmitting event.

1. A start flag and a code indicating spontaneous emission mode or ordered transmission mode. (8 bits)

2. The identity code of the station. (48 bits, 8 signs each of 6 bits)

3. The position in longitude and latitude. (24 bits latitude in 1/1000 min; 25 bits longitude in 1/1000 min)

4. Speed, 11 bits, 2 Kt steps.

5. Flight direction, 12 bits, tenths of degrees.

6. Altitude, 12 bits, 16 Ft steps.

7. Time, 6 bits, when the transmitted values were actual (0–60 sec.).

8. Status bits, declaring advance notice of change of blocks etc.

9. A control check sum.

10. An end flag.

As apparent from FIG. 2, the communication processor 5 includes a microprocessor 10, a RAM 11, a program memory PROM 12 and a timer circuit 13, all cooperating via a data bus 14 and an address bus 15. For connection with further units, there is a serial communication circuit 16, and for transmission and reception a synchronous communication co-processor 17. The microprocessor may be a HD64180 chip (Hitachi), and the co-processor a Siemens SAB 82525 (version VA3). Timer circuit 13, which keeps trace of the time multiplex, is fed from the GPS unit 4 (FIG. 1) with signals time synchronized in UTC via a lead 18 (FIG. 2), receiving a time signal per second and further time information from the GPS system. Drivers 19 and 20 complete the circuit and are included for the purpose of obtaining suitable matching of signals.

The RAM memory 11 stores a catalogue of all received signals from other stations, so that identities and positions are stocked and updated. All receivable participants will be heard within the maximal frame, and in order not to fill the memory with inactual participants, such participants are removed if they are not heard again within a prescribed time. Further, information is stored about which time blocks are free. The communication processor also determines the repetition rate of emission, dependent on density of traffic or on order from a central ground station.

Figure 3:
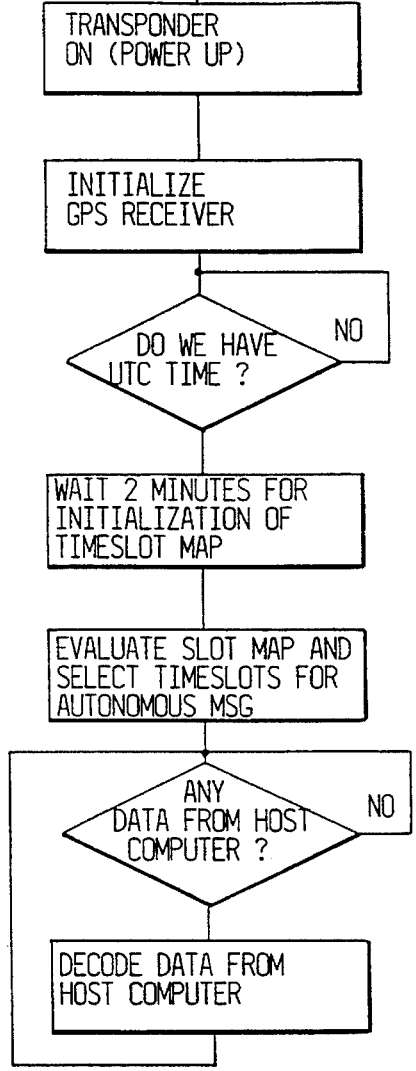
FIG. 3–7 show respective flow diagrams for an exemplary computer program.

The microprocessor 10 works with software comprising a real time operative system, driving in different priorities a number of different programs:

Program 1 reads and decodes data from a host computer, which may be computer 2 in FIG. 1 or, in case of a fixed control station, its own host. A flow diagram for this program is shown in FIG. 3.

Figure 4:
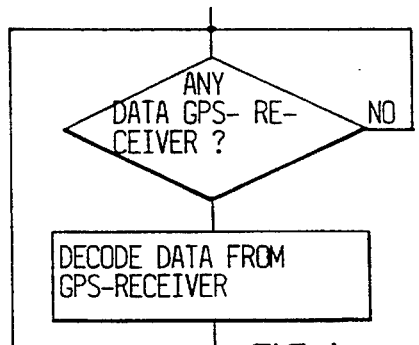

Program 2 reads and decodes data coming from the GPS receiver 4, according to flow diagram in FIG. 4.

Figure 5:
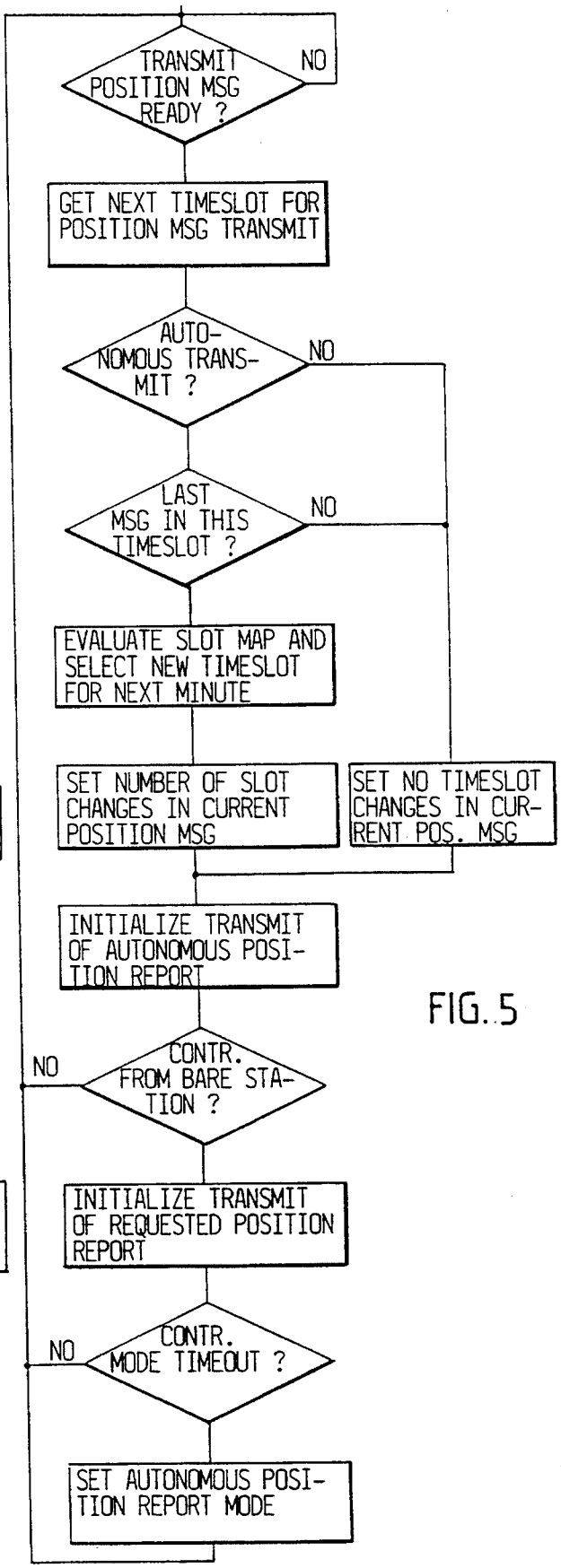

Program 3 generates messages and manages transmission and other control features for the transceiver 6 (FIG. 1), according to flow diagram shown in FIG. 5.

Figure 6:
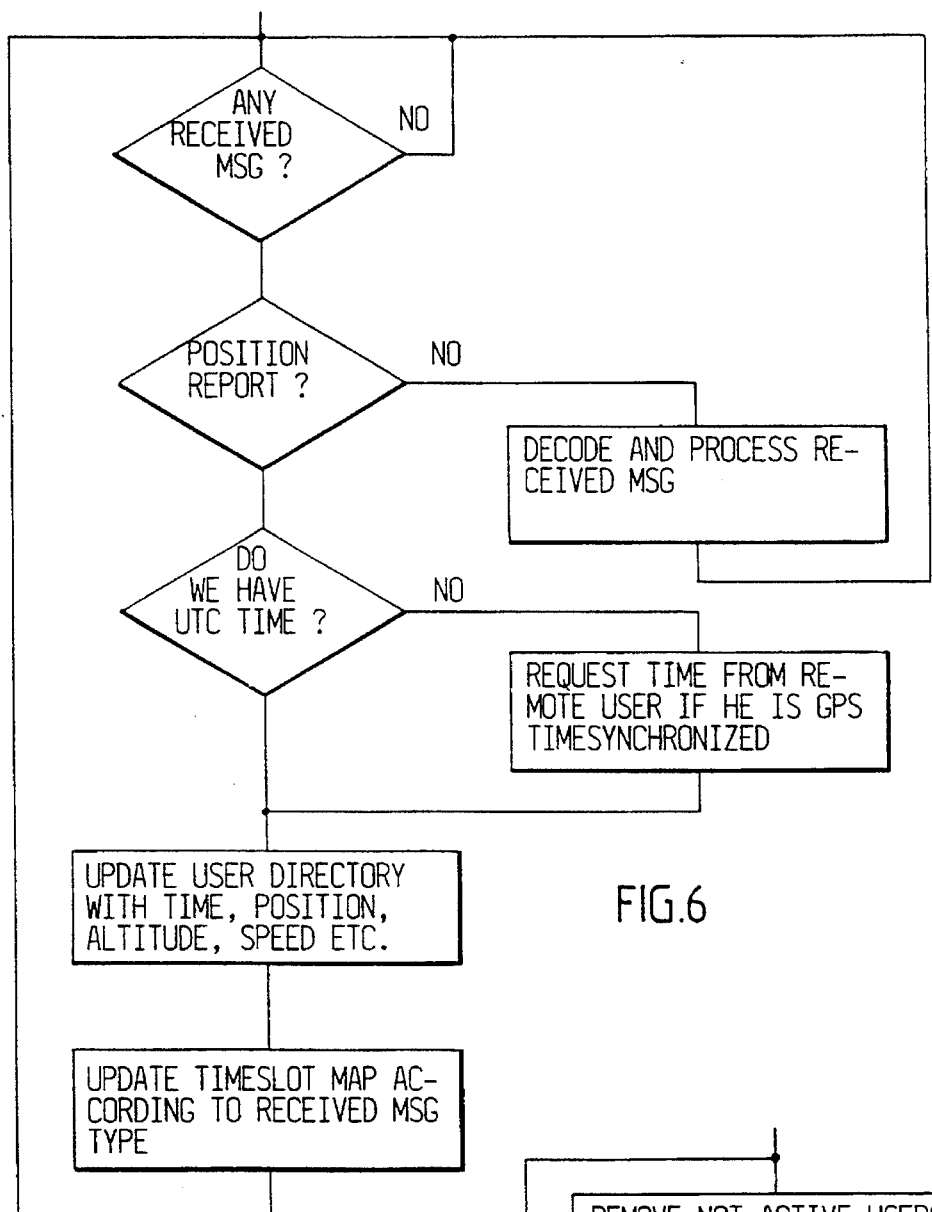

Program 4 supports the reception and decoding of received data messages from the transceiver, and updates the directory of the other users including mapping of time blocks or time slots as occupied, according to the flow diagram of FIG. 6.

Figure 7:
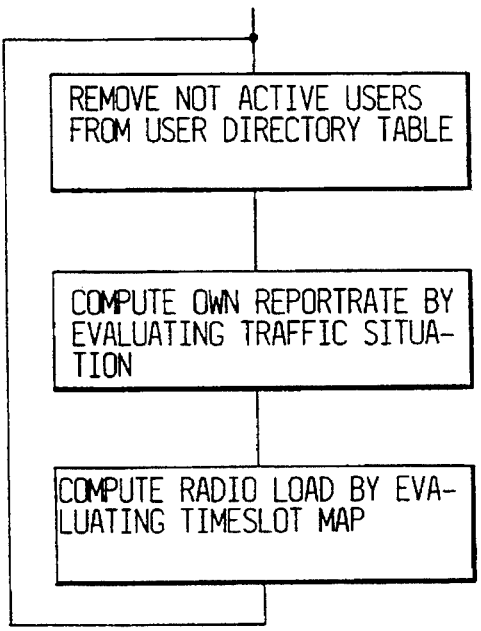

Program 5 keeps the user directory updated by removing participants who have stopped being heard, either because they have landed and shut off or because they are now beyond reach. Further, the own report rate is calculated, e.g. by calculating how many neighbors are within a predetermined distance. A lowest transmission rate is predetermined and not to be fallen below of. Further, the radio channel load is determined. A flow diagram of program 5 is shown in FIG. 7.

Presentation computer 2 fetches its data from the catalog in the memory of the communication processor and manipulates the information, in part for the needs of the monitor, and in part for enabling the signaling to the pilot for action which may be needed. As during long hauls, the level and frequency of stimuli are low, it is difficult to keep full attentiveness, and it is therefore very valuable to be able to make precise signals demanding attention, according to certain criteria (another station nearby, on its way to the own station, etc.).

For proper functioning, it is particularly important for all stations to dispose of a time base having good security. In the Example, this is accomplished in the timer circuit 13, which, receiving once per second a time pulse from the GPS unit, can synchronize the clock frequency of the processor within the demanded accuracy, that is, so that the time blocks assigned or appropriated can be held.

It is also possible, if for some reason the GPS receiver of a station lapses, to take help from the time signals received from neighboring stations, including ground stations. The signals received by radio maybe used as another plurality of geometrically distributed transmitters having known positions. The accuracy of the position would of course suffer. It is then preferred to include in the message an information that the position information is less accurate. Should the GPS satellites fail for some reason, an unlikely event, the system may still work to a limited degree as long as the plurality of ground stations can keep a common time, e.g. with accurate clocks which might be calibrated from a satellite chosen out of the geostationary satellites in existence.

It is necessary, in order to make the present system useful as a worldwide system, that a common protocol is used for frequencies to be used as well as for the disposition of for example time blocks and frames. The present Example can therefore only be seen as a non-limiting example of the application of the invention, as will be readily understood by the man of the art.

| POTENTIAL APPLICATIONS OF THE GP & C GNSS CONCEPT | | | | | |
|---|---|---|---|---|---|
| FUNCTIONALITY/PHASES OF FLIGHT | AT GATE/ A/C STAND | TAXIING IN-OUT | TAKE-OFF CLIMB | EN-ROUTE | APPROACH/ LANDING |
| Update of Maps | X | | | | X |
| Loading of Actual Flight Plans | X | | | | |
| Monitoring of Service Vehicle Movements | X | X | | | |
| Vehicle and Aircraft Fleet Management | X | X | X | X | X |
| ATC Clearance Delivery | X | X | X | X | X |
| Taxi Guidance | | X | | | |
| Docking Guidance | X | | | | |
| Runway Incursion Prevention | | X | | | X |
| Situation Awareness/ Collision Avoidance | | X | X | X | X |
| ADS Functionality | | X | X | X | X |
| Accurate ETO/ETA- | | | X | X | X |

| POTENTIAL APPLICATIONS OF THE GP & C GNSS CONCEPT | | | | | |
|---|---|---|---|---|---|
| FUNCTIONALITY/PHASES OF FLIGHT | AT GATE/ A/C STAND | TAXIING IN-OUT | TAKE-OFF CLIMB | EN-ROUTE | APPROACH/ LANDING |
| 4-D ATC System | | | | | |
| Reduced Separation | | | | X | |
| Search and Rescue | | X | X | X | X |
| Text Messages | X | X | X | X | X |
| Precision Approach | | | | | X |

I claim:

1. A position indicating system including a population of simultaneously participating movable stations, each station knowing its geographic position through the reception of signals from a plurality of geometrically distributed transmitters having known positions, each participating station having a transmitter for the emission in a common radio channel, of signals indicating its own geographic position, memory means being arranged for the memorization of received information from other participating stations, wherein each movable station has
   a) a time base common to all of said movable stations, said time base being accurately controlled by time signals from said plurality of geometrically distributed transmitters, and defining time blocks which are standardized, enumerable and form a common, accurate, repeating maximal frame of known length,
   b) means for occupying a free time block in each maximal frame and for autonomously transmitting therein of a position signal in the common radio channel.

2. The position indicating system according to claim 1, wherein said common radio channel has a frequency the range of detection of which is substantially limited to line of sight, said plurality of geometrically distributed transmitters comprising satellites emitting time signals, each participating movable station having means for calculating its geographic position and an absolute time for updating its time base using said emitted time signals.

3. The position indicating system according to claim 2, wherein said movable stations are arranged in aircraft distributable around the earth.

4. The position indicating system according to claim 3, further comprising means in each movable station for sensing a transmission order signal from a ground station and for discontinuing said autonomous transmission on reception of said order signal and the for transmitting in a ground station ordered mode, in time blocks indicated by said ground station.

5. The position indicating system according to claim 3, wherein each movable station is provided with time block switching means for systematically switching the time block used, said time block switching means comprising memory means for storing free time blocks in said maximal frame, in which no transmission from other stations is detected, said time block switching means selecting at predetermined intervals a new unoccupied time block for its transmission in the maximal frame.

6. The position indicating system according to claim 5, wherein before transmission in a new selected time block, each station signals in its presently occupied time block its intention to switch to said new unoccupied block.

7. The position indicating system according to claim 5, further comprising appropriating means in each movable station, when no unoccupied time block is detected, for appropriating a time block in use by a geographically remote movable station.

8. The position indicating system according to claim 1, further comprising distance determination means, in each movable station, for determining the geographical distance to its nearest neighbouring movable station, and means for determining as a function of said distance of the number of time blocks in which to send in each maximal frame, for diminishing the load on the common radio channel.

9. The position indicating system according to claim 1, further comprising means for using the signals from neighbouring stations instead of from at least one of said plurality of geometrically distributed transmitters in satellites for determining own position when said signals from satellite are unreceived.

10. A positioning station for a position indicating system comprising a GNSS signal receiver arranged to deliver a geographic position at the station, and a transceiver for transmitting said geographic position in a radio channel, a communication processor (5) connected to said satellite signal receiver (4), and to said transceiver, said radio channel being of a frequency having a physically limited range, said communication processor comprising a time base (13), a time synchronization connection between the time base and the satellite receiver, a microprocessor (10), a RAM memory (11) for collecting position signals received by the transceiver in time blocks determined by the time base, a program memory (12), a data bus (14), an address bus (15), means for accounting of position messages received from neighbouring stations and taken from said RAM memory, and means for transmitting in an autonomous mode own position signals to said transceiver of their transmission in time blocks unoccupied by other stations.

11. The positioning station according to claim 10 wherein said range for the radio channel is substantially limited to the line of sight.

12. The positioning station according to claim 10, further comprising sensing means for sensing ground station order signals from a ground station and for transmitting after the reception of such an order signal of position signals in the radio channel merely as ordered from the ground station, instead of in an autonomous sending mode.

13. A position indicating system including a first population of movable stations and a second population of geographically fixed stations with known geographic locations, each participating station having a receiver for receiving signals from a plurality of satellites provided for determining geographic location, and means for calculating therefrom a geographic location, said satellite signals being provided with time jitters limiting precision of said determined location,
   a) each said fixed station having access to a time base common to all said fixed stations, said time base defining time blocks forming a common, accurate, and repeating maximal frame,
   b) each said fixed station having means for occupying a time block in each maximal frame not occupied by another station, a transmitter for transmitting in said time block in a common radio channel whose frequency is such that its range of detection is substantially limited to the line of sight, and means for transmitting by said transmitter in said time block of information comprising longitude and latitude information, and correction information obtained by comparing its known geographic position to said calculated location, said correction information comprising compensation for said jitter and for varying atmospheric conditions of reception of satellite signals at the location of the fixed station, c) each said movable station having a receiver for receiving signals in said time blocks of said common radio channel, means for comparing its own geographic location as determined from said satellite signals to geographic location information received in said time slots from a plurality of fixed stations and for selecting one thereof, and compensating its calculated geographic location using said correction information received from said selected fixed station.

* * * * *

(12) EX PARTE REEXAMINATION CERTIFICATE (7428th)
United States Patent
Lans

(10) Number: US 5,506,587 C1
(45) Certificate Issued: Mar. 30, 2010

(54) POSITION INDICATING SYSTEM

(75) Inventor: Håkan Lans, Saltsjöbaden (SE)

(73) Assignee: GP & C Systems International AB, Saltsjobaden (SE)

Reexamination Request:
No. 90/007,940, Feb. 16, 2006

Reexamination Certificate for:
| Patent No.: | 5,506,587 |
| Issued: | Apr. 9, 1996 |
| Appl. No.: | 08/170,167 |
| Filed: | Dec. 23, 1993 |

(22) PCT Filed: Jun. 29, 1992

(86) PCT No.: PCT/SE92/00485

§ 371 (c)(1),
(2), (4) Date: Dec. 23, 1993

(87) PCT Pub. No.: WO93/01576

PCT Pub. Date: Jan. 21, 1993

(51) Int. Cl.
*G08G 5/00* (2006.01)
*G08G 5/04* (2006.01)
*G01S 1/00* (2006.01)
*G01S 5/14* (2006.01)

(52) U.S. Cl. .................. 342/357.09; 342/386; 342/454; 370/321

(58) Field of Classification Search .................. None
See application file for complete search history.

(56) References Cited

U.S. PATENT DOCUMENTS

| 3,341,812 A | 9/1967 | Perkinson et al. |
| 3,521,278 A | 7/1970 | Michnik et al. |
| 3,564,545 A | 2/1971 | Gottlieb et al. |
| 3,742,498 A * | 6/1973 | Dunn ........................... 342/88 |
| 3,801,979 A | 4/1974 | Chisholm |
| 4,107,608 A | 8/1978 | Saburi |
| 4,641,304 A * | 2/1987 | Raychaudhuri ............. 370/447 |
| 5,068,916 A | 11/1991 | Harrison et al. |
| 5,153,836 A | 10/1992 | Fraughton et al. |

OTHER PUBLICATIONS

Dielman, Rick, "Time and Frequency Standards from GPS", Microwave System News and Communications Technology, Jun. 1988, pp. 72–79, US.

Okawa, U.S., et al., PLRS Development Testing, IEEE AES Aerospace and Electronic Systems Magazine, Aug. 1988, pp. 10–15, US.

* cited by examiner

*Primary Examiner*—Albert J Gagliardi

(57) ABSTRACT

A plurality of movable objects, such as aircraft, are provided with GPS receivers, enabling the individual determination of longitude and latitutde. Further, the receiver also receives a very precise time base from the GPS satellites. This very precise time base is used to enable all of the plurality of movable objects to transmit in a predetermined radio frequency their identities and positions in precisely determined time blocks. By limiting the range of the frequencies used by the movable objects to transmit, the range of receivability is limited, such that the system may be implemented as a worldwide overlapping mosaic. The transmissions of each movable object may be received by all of the plurality of movable objects, as well as by air traffic monitoring centers on the ground.

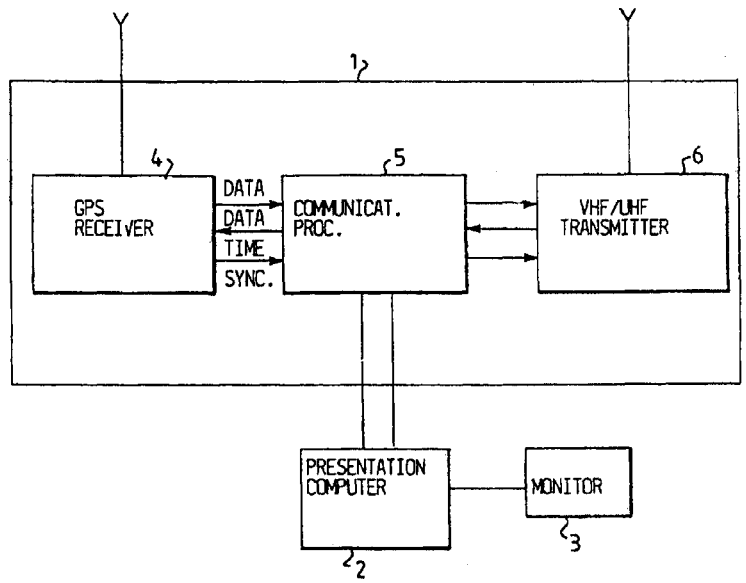

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–12 and 13 are cancelled.

* * * * *